United States Patent
Mala

(10) Patent No.: US 10,339,739 B2
(45) Date of Patent: Jul. 2, 2019

(54) VEHICLE KEY PROGRAMMING SYSTEM AND METHOD

(71) Applicant: SmartBox Technology, LLC, Denver, CO (US)

(72) Inventor: Ornis Mala, Wheeling, IL (US)

(73) Assignee: SmartBox Technology, LLC, Denver, CO (US)

(*) Notice: Subject to any disclaimer, the term of this patent is extended or adjusted under 35 U.S.C. 154(b) by 266 days.

(21) Appl. No.: 15/416,840

(22) Filed: Jan. 26, 2017

(65) Prior Publication Data

US 2018/0211463 A1 Jul. 26, 2018

(51) Int. Cl.
*G07C 9/00* (2006.01)
*G06F 16/2455* (2019.01)

(52) U.S. Cl.
CPC ..... *G07C 9/00309* (2013.01); *G06F 16/2455* (2019.01); *G07C 9/00571* (2013.01); *G07C 9/00857* (2013.01); *G07C 2009/00325* (2013.01); *G07C 2205/02* (2013.01)

(58) Field of Classification Search
CPC ...... G07C 9/00309; G07C 2009/00325; G07C 9/00571; G07C 9/00857; G07C 2205/02; G06F 17/30477; G06F 16/2455
See application file for complete search history.

(56) References Cited

U.S. PATENT DOCUMENTS

| | | | |
|---|---|---|---|
| 6,501,369 B1 * | 12/2002 | Treharne | B60R 25/24 307/10.5 |
| 6,538,557 B1 * | 3/2003 | Giessl | B60R 25/24 340/12.5 |
| 6,700,479 B2 * | 3/2004 | Birchfield | B60R 25/104 340/425.5 |
| 7,315,238 B2 * | 1/2008 | Chambers | B60R 25/24 340/12.23 |
| 7,489,981 B2 * | 2/2009 | Kiuchi | B60R 25/04 700/116 |
| 7,518,489 B2 * | 4/2009 | Nelson | B60T 7/16 307/10.3 |
| 9,070,279 B2 * | 6/2015 | Shimizu | H04L 9/3226 |
| 9,094,382 B2 * | 7/2015 | Kawamura | H04L 9/0869 |
| 9,489,789 B2 * | 11/2016 | Kawamura | G07C 9/00896 |
| 9,509,496 B2 * | 11/2016 | Kawamura | B60R 25/24 |
| 9,714,004 B2 * | 7/2017 | Kawamura | B60R 25/24 |
| 10,030,590 B2 * | 7/2018 | Hagedorn Maillard | F02D 29/02 |
| 2005/0099265 A1 * | 5/2005 | Dix | G06Q 10/02 340/5.72 |

(Continued)

OTHER PUBLICATIONS

OBDChinaVideos "Auto Locksmith Tool Car Key Programmer CK-100 CK100 V39.02 SBB" youtube, Jul. 2013, https://www.youtube.com/watch?v=NH_WrDj9kAl (Year: 2013).*

(Continued)

*Primary Examiner* — Jung W Kim
*Assistant Examiner* — Carlos M De Jesus Lassala

(57) ABSTRACT

A vehicle key programming system and method for chip reading and writing, key and remote programming and remote frequency testing. The system tracks programming usage when not connected to system servers and reports such usage upon connection. Immobilizer algorithms are used to program and such algorithms are optimized with each attempted use.

16 Claims, 12 Drawing Sheets

(56) References Cited

U.S. PATENT DOCUMENTS

| | | | | |
|---|---|---|---|---|
| 2008/0150683 A1* | 6/2008 | Mikan | ............... | G07C 9/00309 340/5.31 |
| 2008/0150685 A1* | 6/2008 | Desai | ............... | B60R 25/2081 340/5.61 |
| 2010/0220857 A1* | 9/2010 | Kawamura | ........... | H04L 9/0844 380/44 |
| 2013/0329890 A1* | 12/2013 | Kawamura | ........... | H04L 9/0816 380/281 |
| 2014/0266587 A1* | 9/2014 | Lopez | ............... | G07C 9/00309 340/5.61 |
| 2014/0359292 A1* | 12/2014 | Kawamura | ........... | H04L 9/0866 713/168 |
| 2015/0084753 A1* | 3/2015 | Biondo | ................. | B60R 25/04 340/426.11 |
| 2018/0095456 A1* | 4/2018 | Obaidi | .................. | G07C 5/008 |

OTHER PUBLICATIONS

Speedkar99 "Key Immobilizer and Remote Programming Using Toyota Techstream Software—Toyota/Lexus" youtube, Nov. 2015, https://www.youtube.com/watch?v=4F3Xu_GdbgU (Year: 2015).*

* cited by examiner

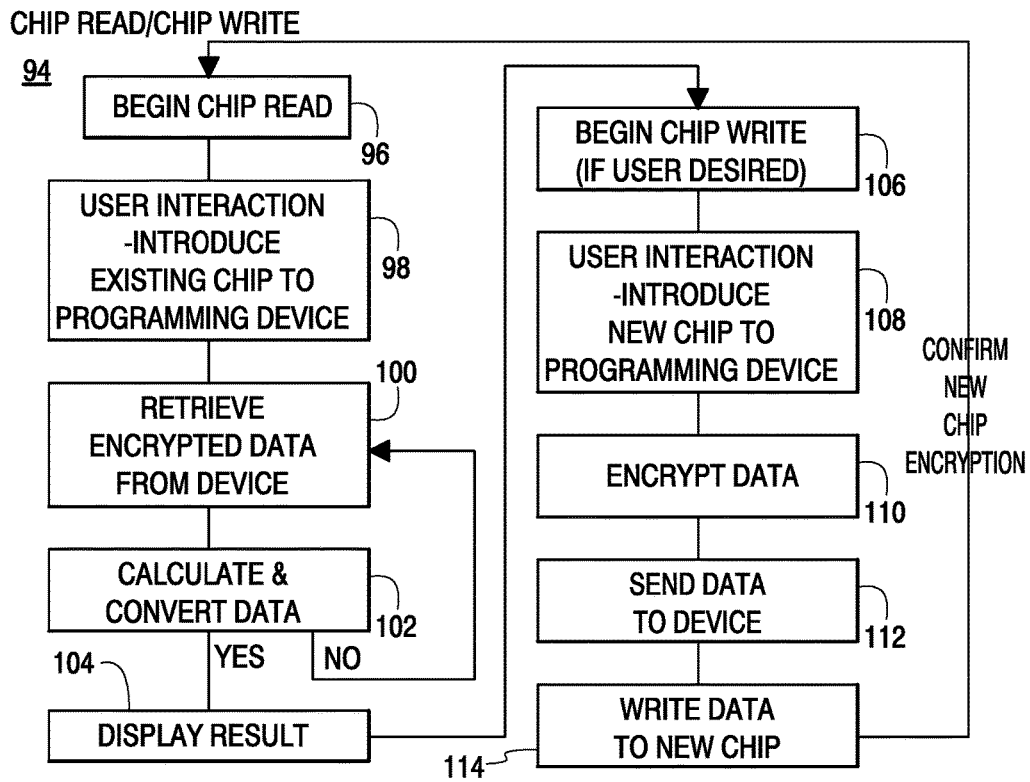

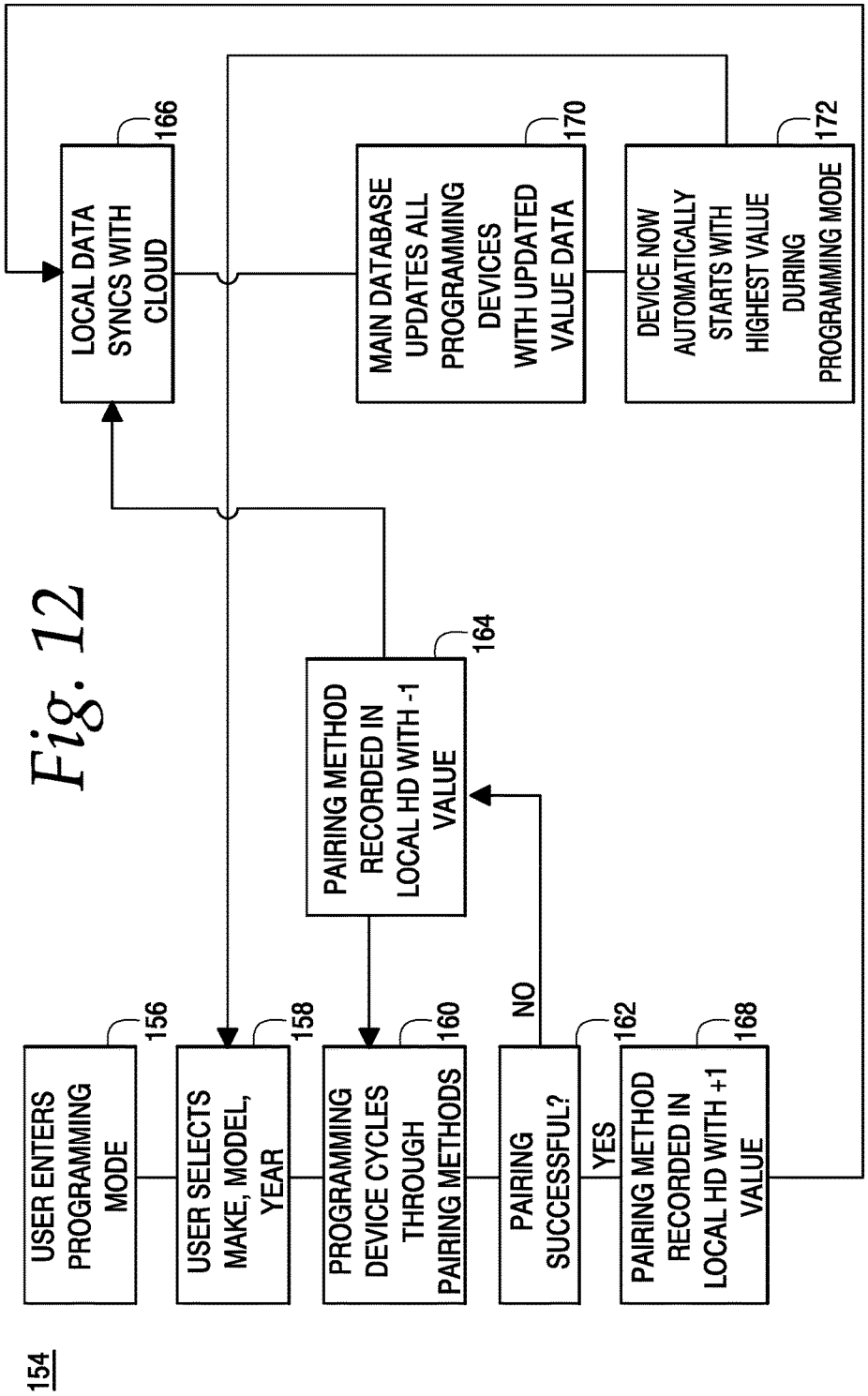

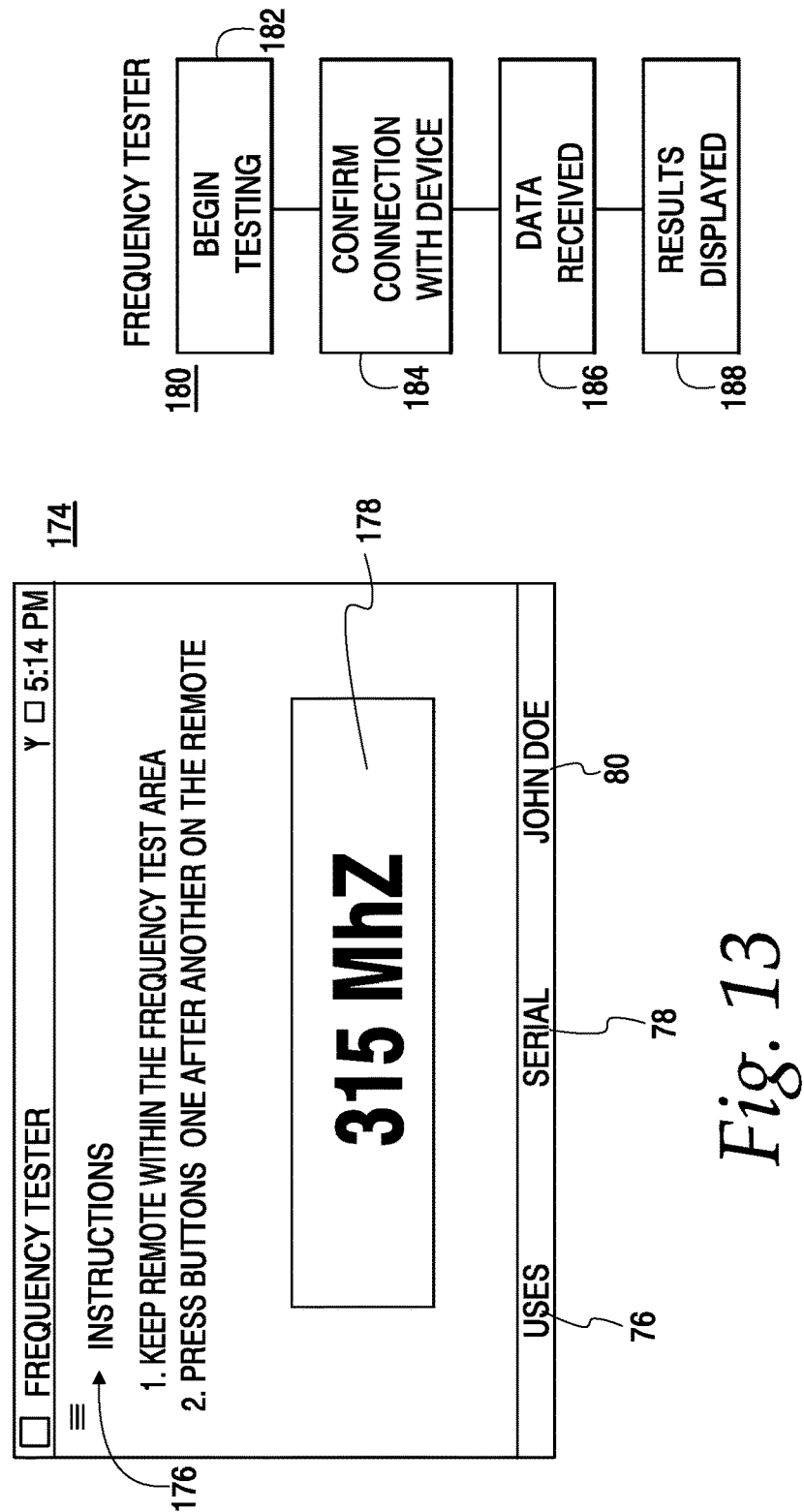

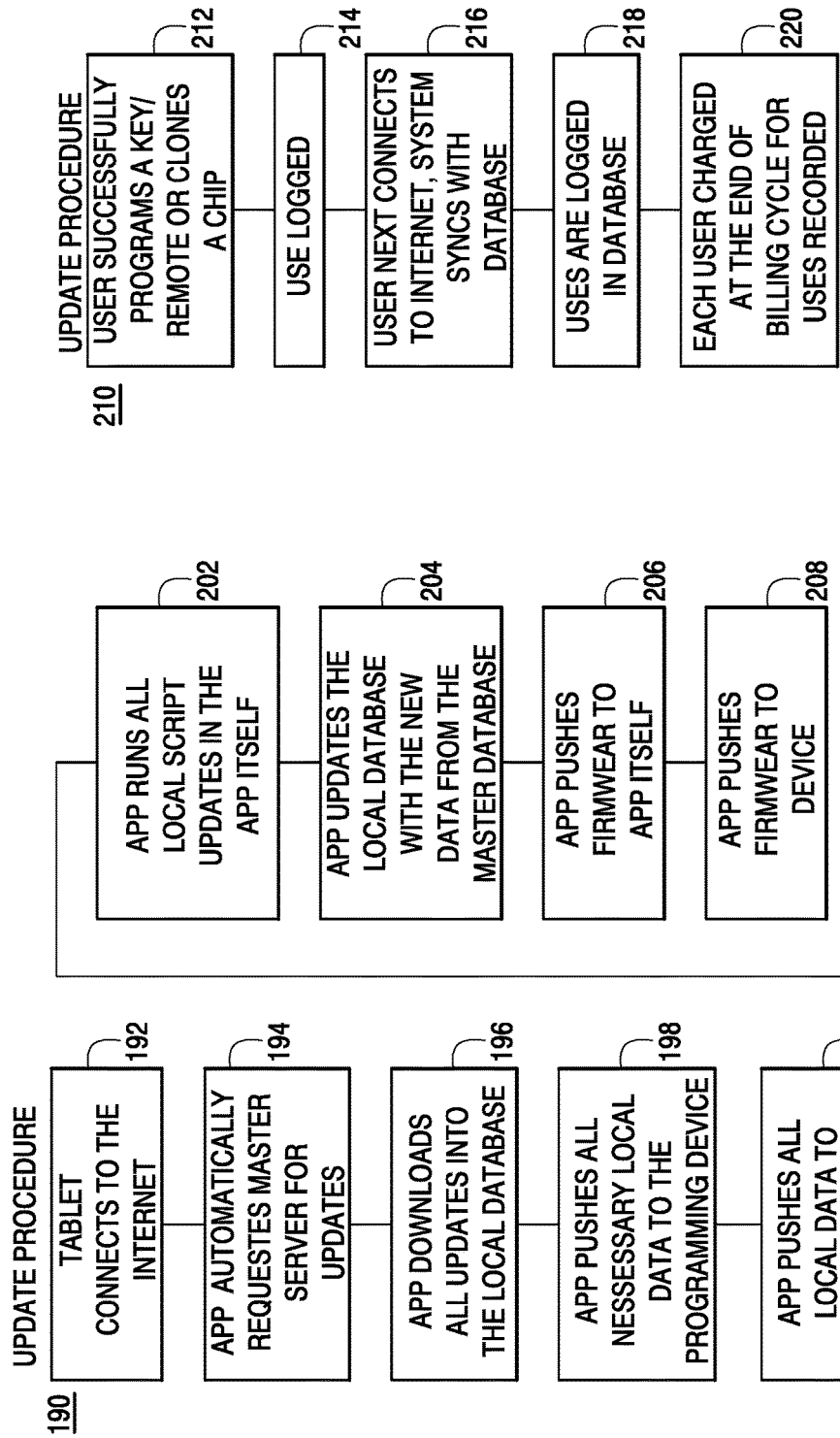

VEHICLE KEY PROGRAMMING SYSTEM AND METHOD

CROSS-REFERENCE TO RELATED APPLICATION

None.

BACKGROUND OF THE INVENTION

I. Field of the Invention

The present disclosure relates generally to the programming of keys, and more specifically to a system and method for multiple vehicle key microchip reading/writing, programming, and frequency testing.

II. Description of the Prior Art

Keys have an uncanny ability to get lost inside coat pockets or underneath couch cushions or to somehow disappear altogether. Prior to the 1990s, while certainly inconvenient, key replacement was not overly complicated nor costly. A basic car key had no security feature other than its unique cut. The shank, which is the long metal part of the key, had cuts and grooves like a house key, for example. Spare keys could be obtained at almost any hardware store or locksmith shop, and of course the car dealership. It is relatively easy to copy these keys. Indeed, a locksmith doesn't need any extra equipment as he can use the same machine he uses to cut other keys. Unfortunately, because such keys are easy to copy, it is/was also relatively easy for a thief to steal the vehicle. While advancements in key technology have made vehicles more difficult to steal, the costs of key replacement has dramatically increased with each advancement.

The first advancement, and the one on most cars, was the electronic key fob, also known as a remote or transmitter. When such a key needs replacement, it will need to be programmed for the specific car. Such programming, for example, may possibly be done with a specific combination of button presses on the remote and key turns on the car ignition. Some owner manuals provide this information, and it might also be available online, but dealerships often want to charge a key programming fee on top of the key replacement fee.

The next advancement was the electronically programmed transponder key. To start a vehicle with an electronic transponder key system, a key having the proper code must be inserted into the ignition. If the electronic transponder key does not provide the appropriate signal, based upon the electronic code programmed into the key, the vehicle's security system will not authorize starting, and the ignition will not work. This so-called ignition immobilizer prevents the vehicle from being stolen in most cases. Immobilizers are so effective at preventing theft that they are now offered standard on most new cars; and they can be installed as an aftermarket option on older vehicles. One disadvantage of these immobilizer systems is that vehicle keys with the embedded transponder are more expensive and time consuming to replace if lost and usually requires a visit to a dealership. However, programming of transponder keys can be done with a so-called multiple vehicle programmer, which is typically a very expensive handheld electronic device capable of interfacing with the vehicle security system, reading electronic values from the vehicle computer system, and programming an electronic key based upon values read out from the vehicle computer. In order to properly interface with the vehicle and program keys, the device must have the appropriate vehicle immobilizer algorithm. Without this algorithm the device will not work. As such, these multiple vehicle programmers must have the correct algorithms for each make model and year of vehicle.

Further technological key enhancement has provided the so-called smartkey, which are not even keys in the traditional sense. They are fobs that are either inserted in the dash or, in the more advanced systems, stay in your pocket or purse. The vehicle is started with a mere press of a button. The main additional form of security of the smartkey is its ability to use rolling security codes. The system randomizes the correct code and prevents thieves from hacking using a device called a code grabber. The vehicle computer recognizes the code emitted by the smartkey and verifies it within the immobilizer before starting the engine. Replacement of smartkeys are very costly. Indeed, dealerships tend to keep programming in-house to keep and protect the inflated cost of replacement.

As keys are lost, destroyed, stolen, or may become inoperable, dealerships and specialized locksmiths provide a service of programming a new key to work with a given vehicle. The cost of the key replacement, and especially the service to program the replacement key, becomes increasingly high from fob to transponder to smartkey. Although using a locksmith instead of going through a dealership may be slightly less expensive, the current key programmers used by the locksmith cannot program all makes and models of keys. Indeed, the typical device used is limited to key cloning or frequency testing or chip reading or key/remote programming. Furthermore, and as noted, if in key programming mode, such devices are further limited in their widespread use capabilities. Therefore, there exists a need for a new and improved device for vehicle key programming. The present disclosure seeks to overcome these and other disadvantages and limitations in the conventional systems and methods.

Accordingly, it is a general object of the present disclosure to provide a more cost and time effective system and method for vehicle key programming.

It is another general object of this disclosure to provide an all-inclusive system and method that can clone and program all vehicle keys, including smartkeys, remote head keys, fobiks, remotes and transponder keys, as well as test key frequency.

It is a more specific object of the present disclosure to provide an application for vehicle programming that can be updated upon connection with system servers.

It is another more specific object of the present disclosure to provide an application for vehicle key programming that tracks usage when not connected to system servers and reports such usage upon connection.

It is yet another more specific object of the present disclosure to provide a vehicle key programming system and method that uses immobilizer algorithm options to optimize appropriate algorithms.

These and other objects, features and advantages of this disclosure will be clearly understood through a consideration of the following detailed description.

SUMMARY OF THE INVENTION

According to an embodiment of the present disclosure, there is provided a system for programming vehicle keys that includes a system processor having a master database that includes vehicle information and associated vehicle immobilizer algorithms. Key programming devices have been downloaded with the vehicle information and interface with vehicles to program keys. The devices provide preferred pairing methods between the vehicle and the key and are capable of adjusting a value associated with each method in response to key programming. The system optimizes the pairing methods when received from each device and downloads the updated information thereto.

There is also provided a method for programming vehicle keys providing the steps of storing vehicle information, including pairing algorithms with associated values, in a master database, storing the information within a local database of a vehicle programming device, coupling the programming device to a vehicle and an associated key, receiving vehicle information and determining a preferring pairing method before programming the key, adjusting the value of the paired programming method based upon the programming of the key, calculating a new preferred pairing method in response to the adjusted values and updating all of the programming devices with the new preferred pairing method.

There is also provided a device for programming vehicle keys including a processor for processing instructions and a local database including vehicle information including associated vehicle pairing methods wherein each method has a value. The device connects to a vehicle, and in response thereto, determines a preferred pairing method and adjusts the value of the selected pairing method in response to key programming. The device then connects to the system servers and the master database wherein the device provides the adjusted values and received updated vehicle information.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 9 is a simplified logic diagram of the chip read/chip write of the vehicle key programming system and method of the present disclosure.

FIG. 10 is a PCD screen shot illustrating a programming screen of the vehicle key programming system and method of the present disclosure.

FIG. 12 is a simplified logic diagram of a value algorithm for vehicle selection within the vehicle key programming system and method of the present disclosure.

FIG. 13 is a PCD screen shot illustrating a frequency testing screen of the vehicle key programming system and method of the present disclosure.

FIG. 14 is simplified logic diagram of the frequency testing of the vehicle key programming system and method of the present disclosure.

FIG. 15 simplified logic diagram of the update procedure of an embodiment of the vehicle key programming system and method of the present disclosure.

FIG. 16 is a simplified logic diagram of a uses method within the vehicle key programming system and method of the present disclosure.

DESCRIPTION OF THE PREFERRED EMBODIMENTS

Figure 1:
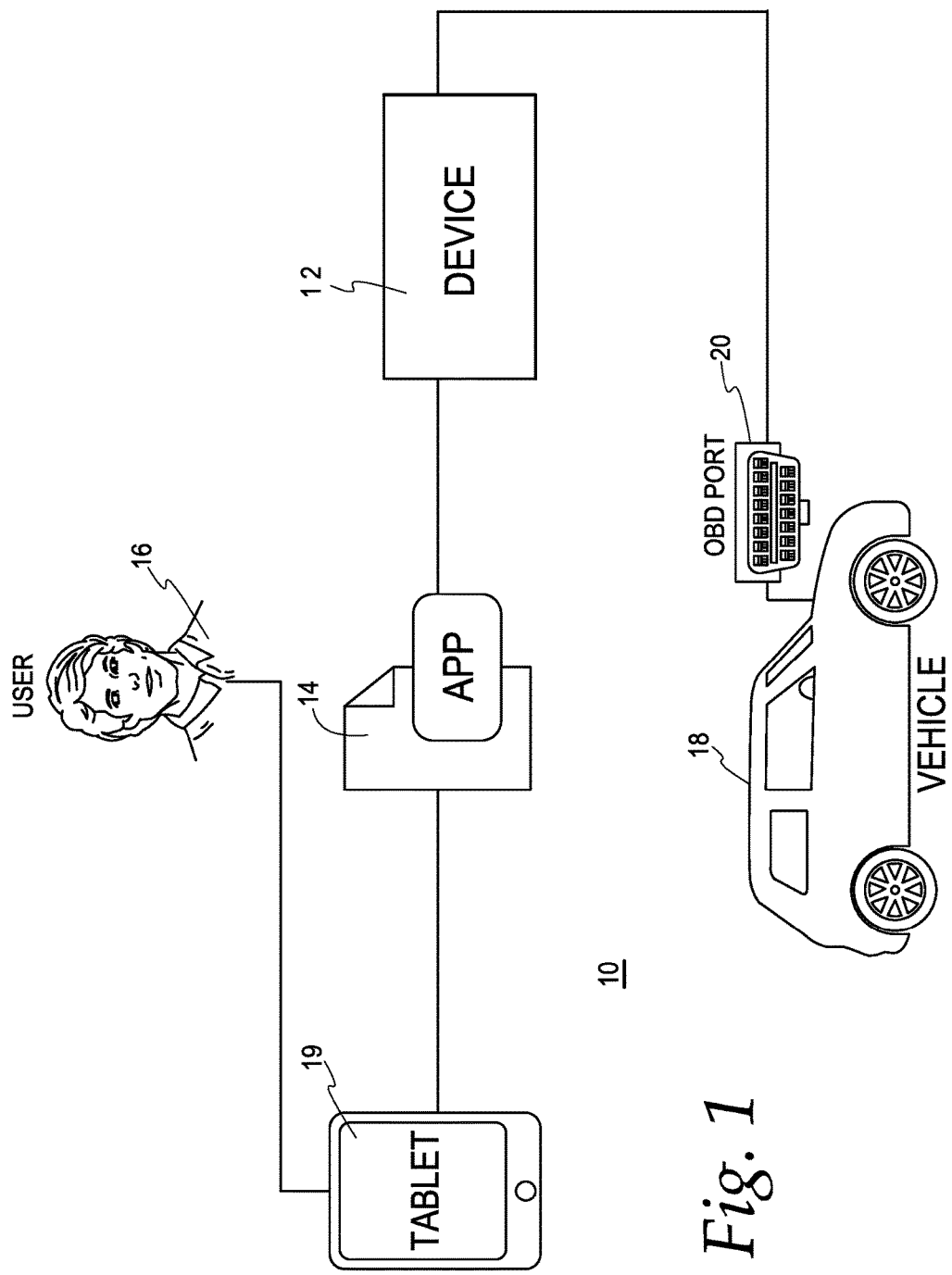
FIG. 1 is a practical user overview diagram of the vehicle key programming system and method of the present disclosure.

One or more embodiments of the subject disclosure will now be described with the aid of numerous drawings. Turning first to FIG. 1, a practical user overview of an embodiment of the present vehicle key programming system and method is shown. In particular, the system 10 includes a programming device 12 and system application (software) 14 in which a user 16 can communicate with a vehicle 18 through a personal communication device (PCD) 19 and the vehicle on-board diagnostics (OBD) port 20. In this embodiment, the PCD is a tablet computer running the application 14. However, it will be understood that the programming device, application and computer may all be within a single device.

Figure 2:
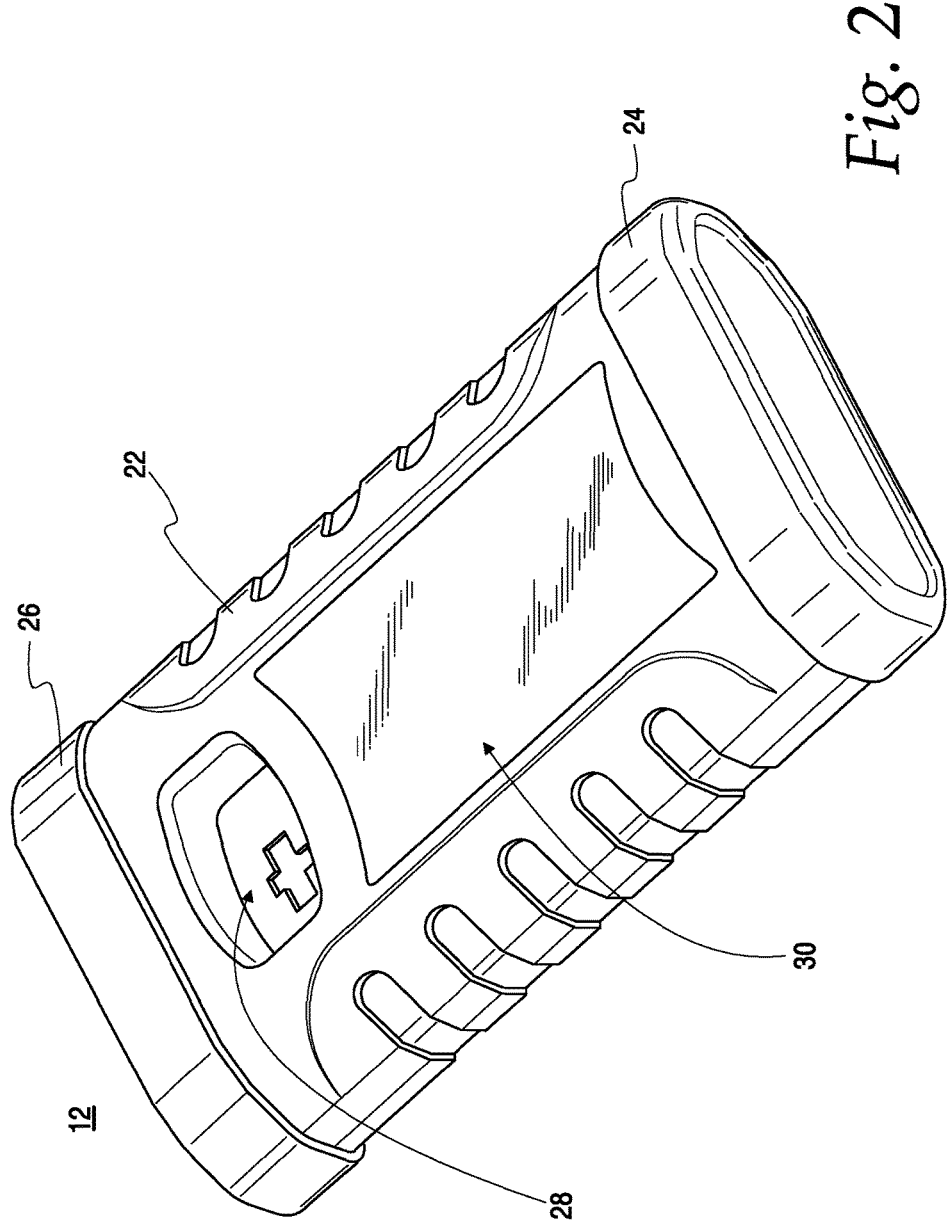
FIG. 2 is a front perspective view of an embodiment of the programming device of the vehicle key programming system and method of the present disclosure.
Figure 3:
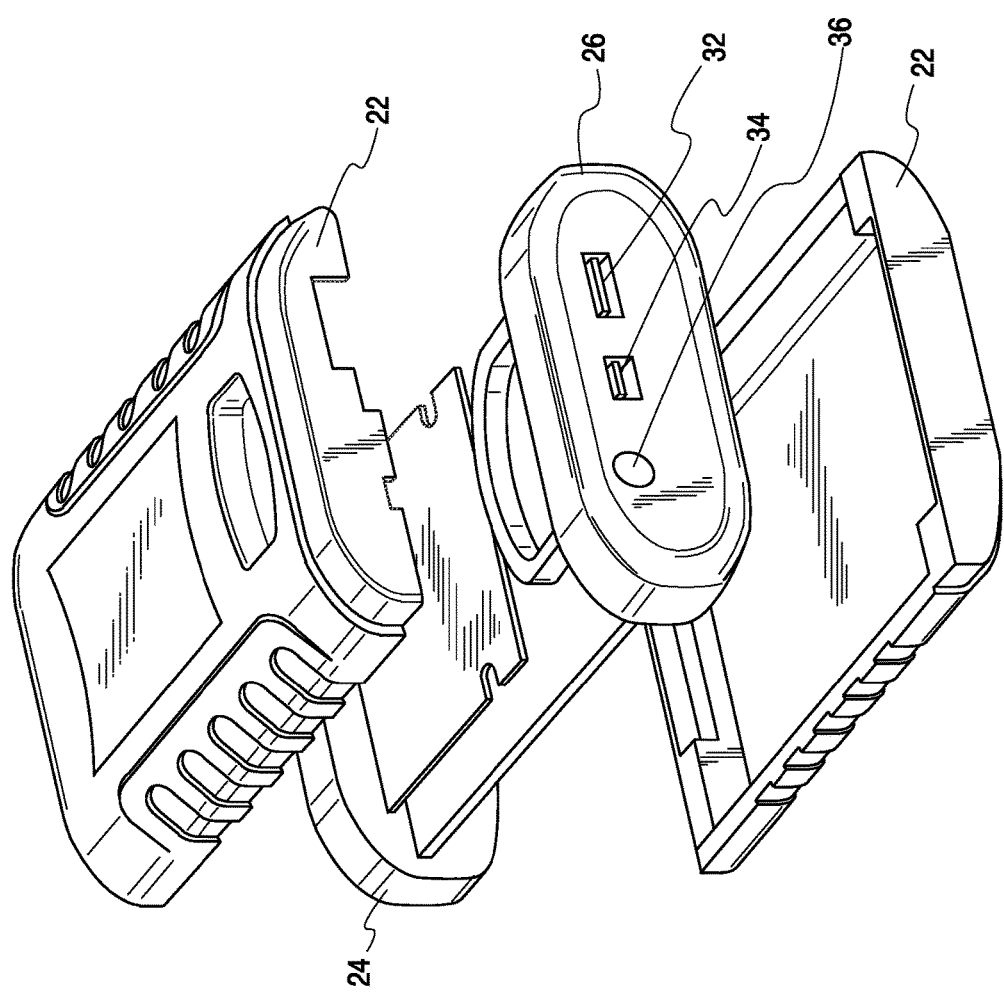
FIG. 3 is an exploded rear perspective view of the device of FIG. 2.

Referring now to the hardware of the programming device of FIG. 1, FIGS. 2 and 3 illustrate front and rear perspective views of the device 12, respectively. The device includes an outer plastic shell 22 with rubber front 24 and back 26 ends. A chip read and chip clone area 28 is located near the front end and a frequency test area 30 is located near the middle. The device 12 further includes a OBD cable port 32, a USB cable port 34 and a power port 36.

Figure 4:
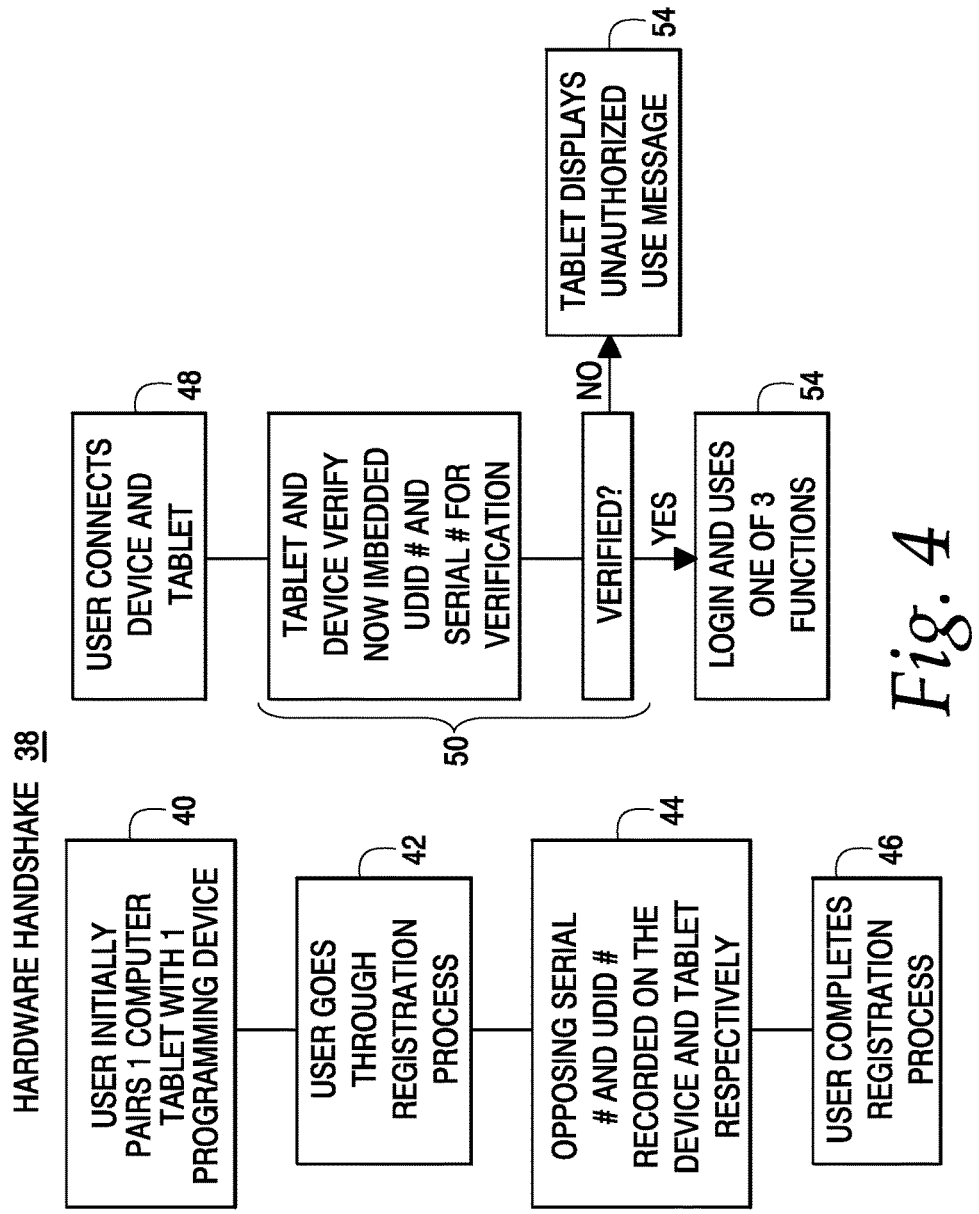
FIG. 4 is a simplified logic diagram of the hardware handshake of an embodiment of the vehicle key programming system and method of the present disclosure.

Before a user is able to use the system 10 for the first time, he must complete a registration process by, in this first embodiment, pairing a tablet, the application and a programming device. FIG. 4 illustrates a hardware handshake logic flow diagram 38 between the PCD 19 and the programming device 12. Once the PCD 19 and device 12 are powered up and connected via a USB cable, the user needs to start the pairing process 40 between one computer tablet and one programming device. The user then goes through a registration process 42, opposing serial number and Unique Device Identification (UDID) number are respectively recorded 44 and the user completes the registration process 46. In this pairing process, the application retrieves the tablet identification number and saves it into the memory of the device and takes the serial number of the device and saves it into the local database of the tablet. User information, tablet identification number as well as the serial number get saved into the master server through a communication network (i.e. internet), supra. When registration is completed, the paired tablet will only work with the associated programming unit.

Figure 5:
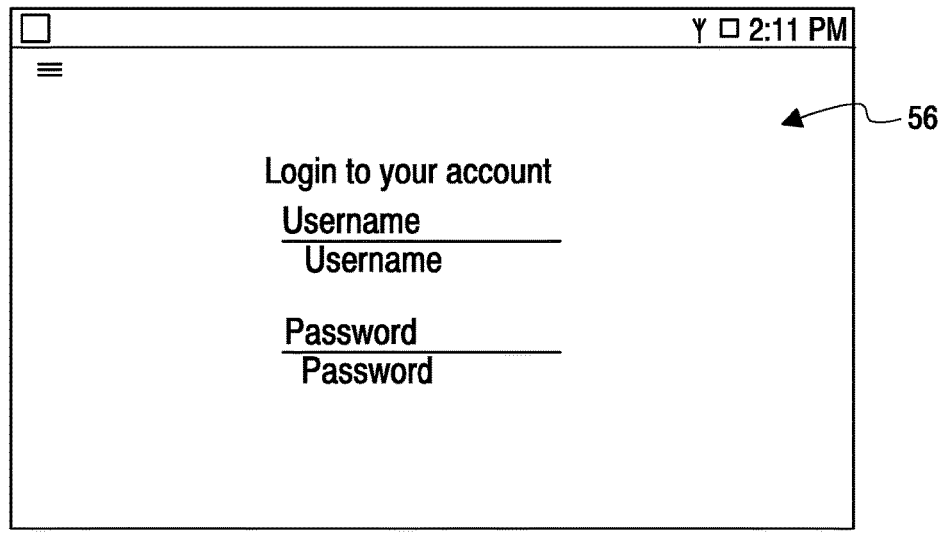
FIG. 5 is a personal communication device (PCD) screen shot illustrating a user login to the vehicle key programming system and method of the present disclosure.

Each time the device and tablet are subsequently connected, the application will automatically begin by establishing a secure connection and proceeding to a verification process. The user connects 48 the device and tablet whereby the tablet and device verify 50 the previously embedded UDID and serial numbers. If they are not verified, the tablet displays an unauthorized use message 52. If they are verified, the user can login 54 to the system and is eligible to use all the offered features within the programming device. FIG. 5 illustrates a login screen 56 on the tablet 19 including a username 58 and password 60.

Figure 6:
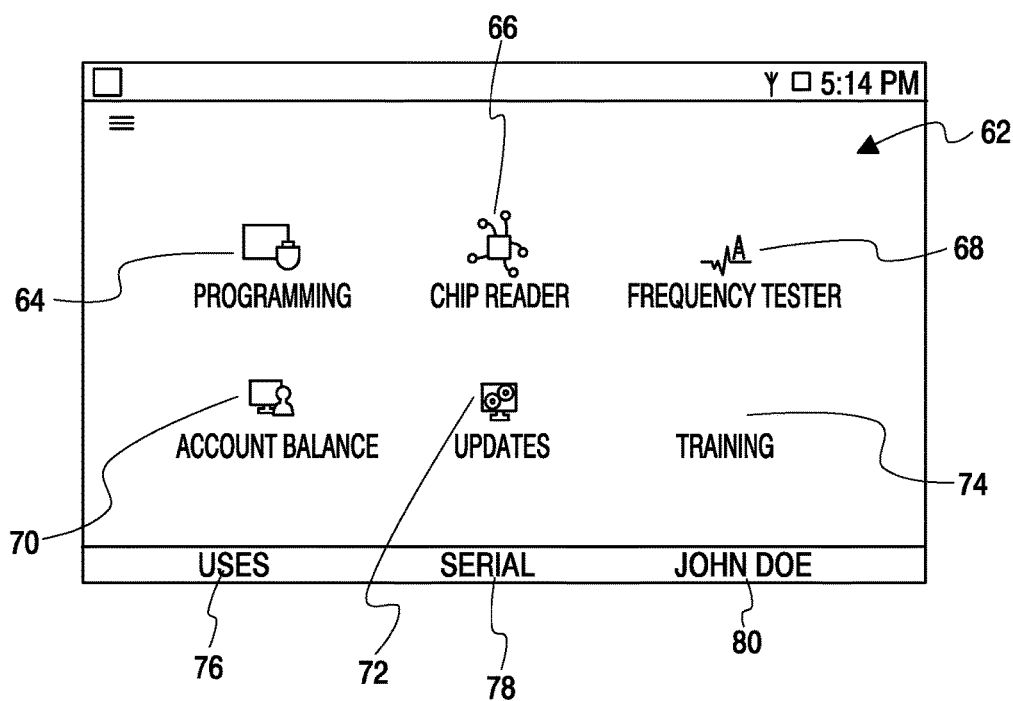
FIG. 6 is a is a PCD screen shot illustrating a home screen of the vehicle key programming system and method of the present disclosure.

Upon successful login, the user is directed to the tablet 19 home screen 62, see FIG. 6. From here the user can select numerous features, including Programming 64, Chip Reading 66, Frequency Testing 68, Account Balance 70, Updates 72 and Training 74. The home screen 62 also provides the user with other informational selections, including Uses 76, Serial Number 78, and User Details 80.

Figure 7:
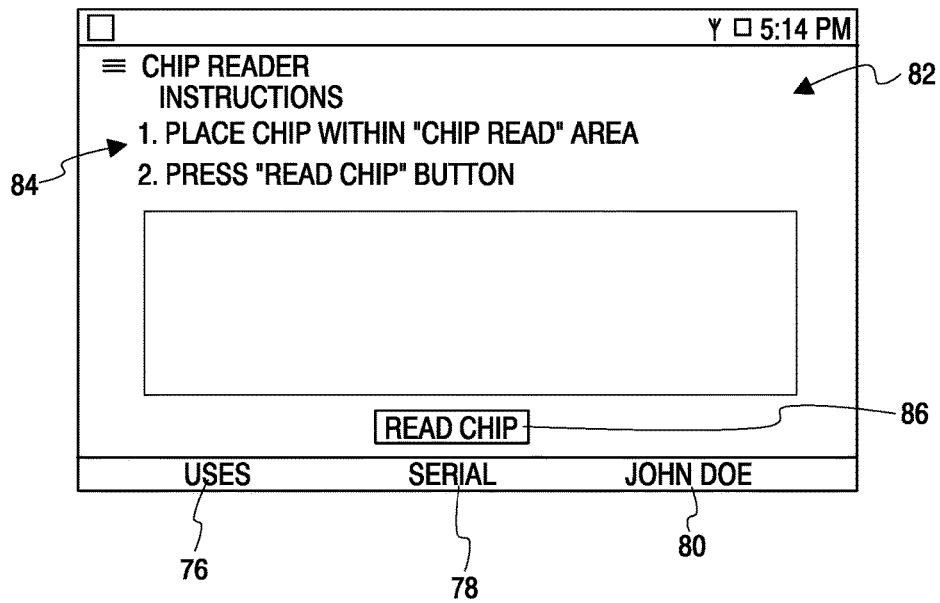
FIG. 7 is a PCD screen shot illustrating a chip reader screen of the vehicle key programming system and method of the present disclosure.
Figure 8:
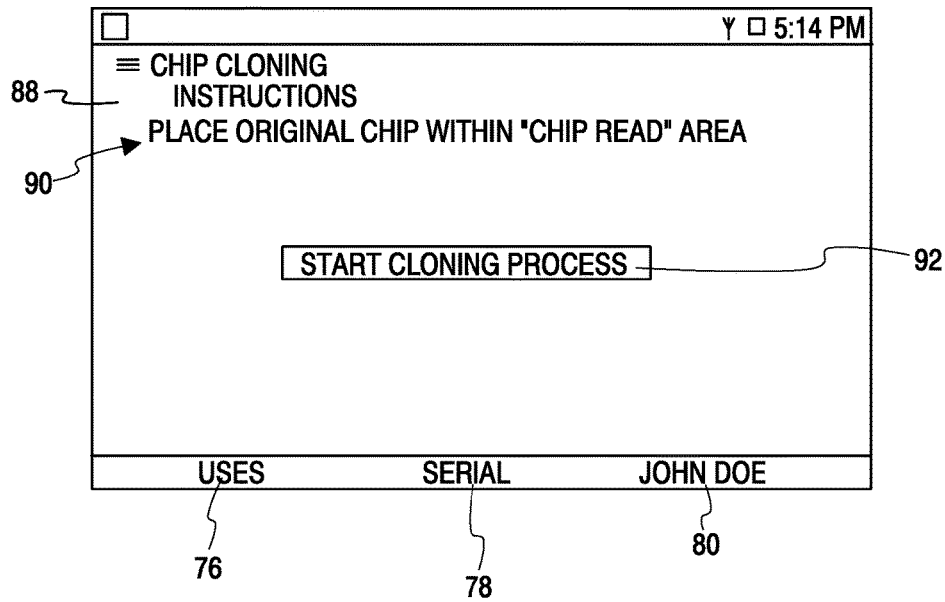
FIG. 8 is a PCD screen shot illustrating a chip cloning screen of the vehicle key programming system and method of the present disclosure.

A selection of Chip Reader 66 from the home page 62 brings the user to the Chip Reader screen 82, see FIG. 7. The user is then instructed 84 to place the chip within the chip read area 28 (of the programming device 12) and select the read chip icon 86. The system then reads any encrypted data from the chipped key, calculates and converts information read from the current chip, and then displays the information to the user. If the user wants to clone the information into another chip, he is brought to the Chip Cloning screen 88, see FIG. 8. The user is then instructed 90 to place the new chipped key within the chip write area 28 (of the programming device 12) and select the start cloning process icon 92. The system then writes the read data onto the new chip. Essentially, this chip read/write feature checks the chip within a key before potentially wasting a key blank.

FIG. 9 illustrates a chip read chip write logic flow diagram 94. The user first begins the chip read 96 and introduces 98 the existing chip to the programming device (12). The device retrieves 100 any encrypted data and, if it can calculate and convert 102 the data, it displays 104 same. Otherwise the user needs to begin the process anew. If the user then desires to write data 106 to a chip, the user introduces 108 a new chip to the programming device (12). Data is then encrypted 110, sent 112 to the device and written 114 to the new chip.

Turning back to the home screen 62 (FIG. 6), should the user desire to select Programming 64, he will be directed to the programming screen 116 of FIG. 10. With the programming device coupled to the vehicle OBD, the user simply enters the Make 118, Model 120 and Year 122 of the vehicle and then selects Submit 124. If necessary, once the device and vehicle are coupled, the vehicle Pincode (if applicable) is read, utilized and stored. After inputting the vehicle information (i.e. Make, Model and Year), the system will confirm the proper product (key) and/or present options to the user to select from a list of workable product (keys). If the user has the appropriate product (key), he can continue through the programming process. In the abstract, communication between the vehicle 18 and the device 12 is established through the application 14, data is retrieved from the vehicle 18, converted, sent back to the vehicle 18 and the key is programmed. In use, each step prior and during the programming procedure is accompanied by an associated image on the tablet 19.

Figure 11:
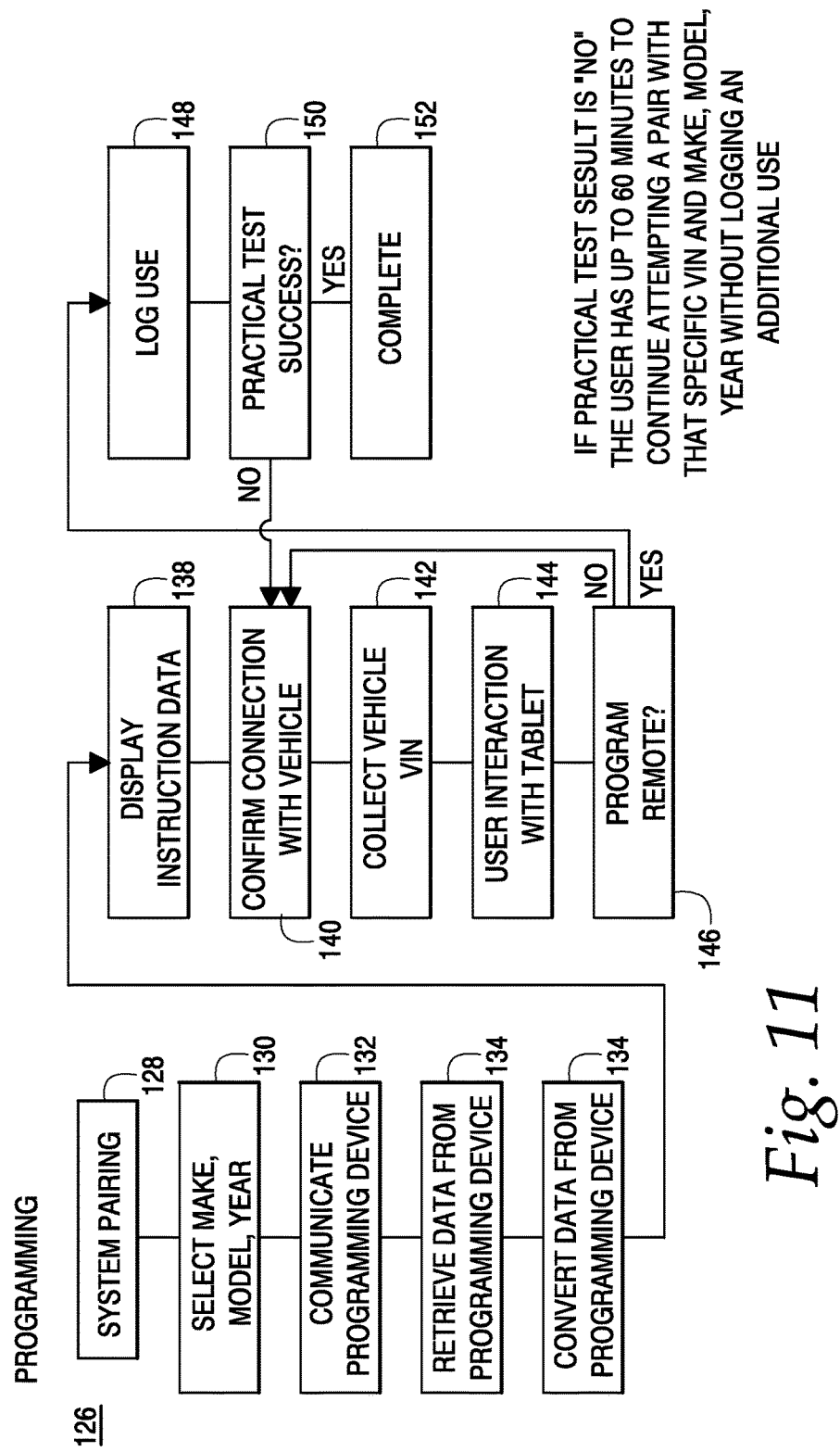
FIG. 11 is a simplified logic diagram of the key programming of the vehicle key programming system and method of the present disclosure.

More specifically, and turning now to FIG. 11 and the programming logic flow 126 of the system and method, initiating of the process starts with pairing 128 of the system and the vehicle. The Make, Model and Year of the vehicle is inputted 130 and communicated 132 through the programming device where it retrieves 134 and converts 136 data before it displays 138 instructions to the user. The user then proceeds through any instructions and then the system confirms 140 a proper connection with the vehicle. The vehicle VIN is collected 142 and the user continues interactions 144 through the tablet and programs 146 the key/remote. If the key is not properly programmed, the system reaffirms 140 a proper connection with the vehicle. If the key is properly programmed, the system logs 148 a use and the user can then perform a practical test 150. If this practical test is unsuccessful, the system reaffirms 140 a proper connection with the vehicle. If the practical is successful, then the process is complete 152. The system is capable of both determining and keeping information about the locations of each programmed key. Additionally, the system tracks the user activities during programming and the time it took to complete the process. Furthermore, the system builds a so-called Order Log for all products being used and programmed. This provides the user the ability to subsequently login and download the list of products they have used and then reorder with their preferred provider.

Within this programming feature, the so-called immobilizers are translated into algorithms for each make, model and year of vehicle. Upon selection of the vehicle, and during the instructional process of the programming logic flow 126, the user will have the preferred immobilizer option to choose from. In most cases, there will be only one immobilizer option, however as the system continues to optimize immobilizer algorithms, the user may have numerous options to choose from. In that case, the user may go through the options manually or select an automated process which will walk him through all of the available options. Each time an immobilizer option is selected, a value is recorded in the local database, and the application will then cycle back to the next immobilizer option in the list of available options until one of them returns a success. If the immobilizer option choses does not work for the specific make, model and year, then the value of "−1", for example, will be recorded. Conversely, a value of "+1", for example, will be recorded for the working immobilizer option. Upon collection of these values in the master server database through system updates (infra), the system will automatically determine which working immobilizer option will be the preferred option for the associated make, model and year, and will also automatically remove all options that have only "−1" values. As more and more systems are implemented, the optimization of preferred immobilizer algorithms will quickly ensue.

This value algorithm optimization will now be further described through the logic flow 154 of FIG. 12. The user first enters 156 the programming mode and selects 158 make, model and year of the vehicle. The programming device then cycles through (either manually through the user or automatically) 160 different pairing methods (immobilizer algorithm options) and determines 162 whether the pairing was successful. If it was not successful, then the pairing method is recorded 164 in the local database with a "−1" value and also later syncs 166 with master database. Similarly, a successful pairing is recorded 168 in the local database with a "+1" value and also later syncs 166 with the master database. Upon connection with the master database (supra) all programming devices will be updated 170 with appropriate value data. Upon receiving these updates, each programming device will continue to optimize the immobilizer algorithms and start 172 with the respectful highest value algorithm for associated make, model, and year during programming mode.

Referring to the home screen 62 of FIG. 6, should the user want to make sure a key/remote is sending the proper signal, he would select Frequency Tester 68, and be directed to the Frequency Tester screen 174 of FIG. 13. The user is then instructed 176 to place the remote within the frequency test area 30 (of the programming device 12) and press buttons one after another on the remote. The frequency will then be displayed 178. The logic flow 180 of the Frequency Tester is shown in FIG. 14. Testing begins 182 and the connection between the key/remote and the programming device is confirmed 184. Transmitted data from the remote is received 186 and the results displayed 188.

Turning back once more to the home screen 62 of FIG. 6, should the user want to update the system, he would select Updates 72 and the system would proceed through an update procedure as illustrated in the logic flow 190 of FIG. 15. Downloading of the updates begin from the local database to the master server and then from the master server to the local database within the application. In particular, the tablet connects 192 to the internet and the application automatically requests 194 the master server for updates. The application downloads 196 any updates into the local database and pushes 198 any necessary updates to the programming device. Then the application pushes 200 all local data to the master database. The application runs 202 all local script updates in the application itself and updates 204 the local database with the new data from the master database. Finally, the application pushes 206 firmware to the application itself and also pushes 208 firmware to the programming device. The system tablet is capable of performing all system updates through WiFi (if desired), a cellular network and/or a direct network connection without the need to directly connect to any other device (such as a desktop computer or the like).

The system has the capability of unlimited usage without having to connect to the internet. A periodic sync, preferably monthly, is required to keep the programming device and the tablet application updated with all the new vehicle data as well as to keep track of usage logs. Once the user goes through the process of programming a key/remote, a successful use is logged in the system and updates the master server, which keeps all the user logs, during the next update. At the end of the billing cycle, the user is charged for the recorded uses. This process is illustrated in the logic flow 210 of FIG. 16. When the user successfully programs 212 a key/remote or clones a chip, a use is logged 214. When the user next connects to the internet, the system syncs 216 with the database and uses are logged 218 in the database. Each user is then charged 220 at the end of their billing cycle for each recorded use.

Figure 17:
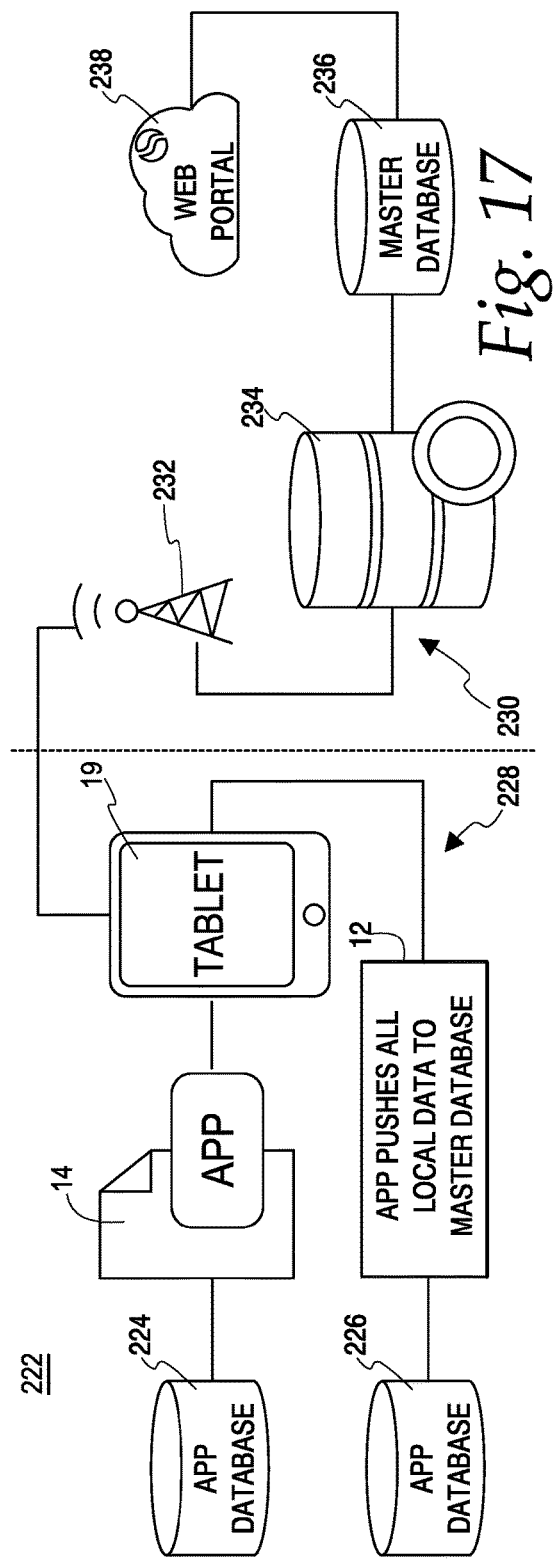
FIG. 17 is a system overview diagram of an embodiment of the vehicle key programming system and method of the present disclosure.

FIG. 17 shows an overview diagram 222 of the vehicle key programming system and method. As previously described, the tablet 18 has a software application 14 that accomplishes numerous processes, including, but not limited to: security validation, server connection, vehicle loading, step logic, chip calculation, frequency conversion and usage tracking. The tablet application has a database 224 that contains, among other things, security data, user information, vehicle data, usage log, notifications and programming device serial number. Similarly, the programming device 12 accomplishes numerous processes, including, but no limited to, security validation, vehicle data conversion, frequency reading, chip reading and writing and vehicle algorithm. The device has a database 226 that contains, among other things, security data, tablet ID, vehicle data and usage details. The tablet 19, application 14, application database 224, programming device 12 and device database 226 are what can be referred to as local parts 228 of the system.

The other side of the system is what can be referred to as the master parts 230 of the system. Every local programming device is synced and updated with the master system upon connection through the communication network (i.e. internet) 232. The master system includes the system server 234, which accomplishes numerous processes, including, but not limited to all security processing, all user validations, all vehicle calculations, all immobilizer value processing, all immobilizer algorithms and firmware files and processing. The system server 234 has a master database 236 that contains, among other things, all programming device information, all user information, all vehicle data, all user logs, all security information and all daily updates. Finally, the web portal 238 provides much useful information, including, but not limited to, user logs, device and user information, vehicle availability, payment details/logs and training manuals.

Figure 18:
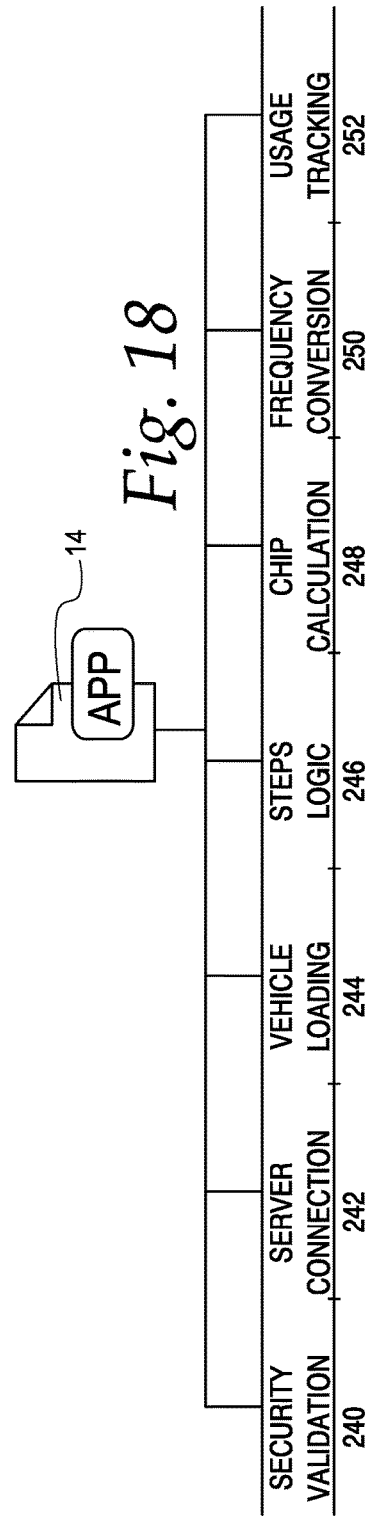
FIG. 18 is application diagram for use with an embodiment of the vehicle key programming system and method of the present disclosure.

The present vehicle key programming system and method 10 has been shown and described with an application 14 running on local programming devices 12. An overview of some of the application features will now be summarized as illustrated in FIG. 18. First, the application 14 performs a security validation 240 so that upon login, the programming device and the tablet match. There is a security lock upon multiple requests to the main database of the application. If the periodic (e.g. thirty days) sync date with the master server is due, then an automated check will lock the device and the user will need to connect to the internet and master server for validation. All suspicious activity is monitored and reported to the master server.

The server connection 242 is established through a self-grown algorithm to the master server. Validation of the connection happens in the master server upon linking. The master server returns information to the device if it is locked by the system admin, as well as data to unlock the locked device. From the master server, the application gets all updates on steps of programming a vehicle, algorithms for each vehicle, notifications from the admin and firmware files. The application sends all the activity logs to the master server, including usage logs, device requests, vehicle data returns, values for each immobilizer (negative and positive), ratings and user feedback.

Upon selection of the vehicle, the preferred and/or chosen immobilizer algorithm gets loaded 244. The application loads the correct algorithm within the device. Throughout the procedure within the programming feature, the application keeps the connection with the device and validates each response that comes from the corresponding vehicle. Once the program algorithm ends and the programming has completed, the application directs the device to go into neutral mode to stop all communication with the device.

When an algorithm has been loaded, the programming requires user interaction to complete the process and the application walks the user through the necessary logic steps 246. The process of communication between the vehicle and the programming device is managed through the application. The vehicle will always respond with an answer, and with user interaction, the application sends the request/question to the device which then gets sent to the vehicle. Each step has a value response which gets saved for reporting and notifies the user.

When reading a chip, information gets sent to the application which then does the calculation 248, gets the chip information from the local database and displays same to the user. When writing a chip, information comes from the devices read from the current chip. One part of the calculation is done within the application, which then sends information to the device to finish the security decoding and writes back into the new chip.

Upon user interaction, the application sends the request to the device to activate the frequency widget 250. Once activated, the application with then, every ¼ second, check with the device for a new signal being transmitted. If so, a number will come from the device which then gets converted into the right frequency to be displayed to the end user.

Every time a vehicle is selected and loaded, and each step the user takes is logged. Because each immobilizer algorithm has a value, the application saves the value response from the vehicle. If a positive value is obtained, then that will count as a use. All positive and negative uses are tracked. The negative values help improve each algorithm whereas the positive values count as uses as well as to help algorithm improvement. Uses get logged in a usage table and then upon user upload, get sent to the master server. Uses are also sent to the device for two-way security protection.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

What is claimed is:

1. A system for programming vehicle keys, the system comprising:
    a system processor having an associated master database including vehicle information and at least one associated vehicle immobilizer algorithm, each of said algorithms having a value;
    at least one key programming device having a processor and an associated local database, said local database including said vehicle information from said master database;
    said at least one programming device having a vehicle interface for communicatively coupling with a vehicle and a vehicle key;
    said at least one programming device determining a preferred algorithm from said at least one associated vehicle immobilizer algorithm, in response to said vehicle, for programming said key and adjusting said value of said preferred algorithm in response to said key programming;
    said system processor and said at least one programming device each having a network interface for communicatively coupling with one another whereby said at least one programming device provides said algorithm adjusted values to said system processor and said system processor calculates a new preferred algorithm from said at least one associated vehicle immobilizer algorithm in response thereto; and
    said vehicle information and said at least one associated vehicle immobilizer algorithms are updated on said local database of said at least one programming device.

2. The system as defined in claim 1 wherein said at least one programming device tracks each key programming and upon connection with said system processor provides a log thereof.

3. The system as defined in claim 1 wherein said at least one programming device is locked from programming keys after a period of time in which it has not connected with said system processor.

4. The system as defined in claim 1 wherein said value is adjusted by a positive value upon a successful key programming and by a negative value upon an unsuccessful key programming.

5. The system as defined in claim 4 wherein said positive value is +1 and said negative value is −1.

6. A method for programming vehicle keys, the method comprising:
    storing, in a master database, vehicle information and at least one associated vehicle immobilizer algorithm wherein each algorithm has an associated value;
    storing, in a local database within a key programming device, said vehicle information;
    coupling said key programming device to a vehicle and an associated key;
    receiving vehicle information from said vehicle;
    determining a preferred programming algorithm from said at least one associated vehicle immobilizer algorithm;
    programming said key with vehicle information;
    adjusting said value of said preferred algorithm in response to said key programming;
    connecting said key programming device with said master database;
    calculating a new preferred programming algorithm in response to said adjusted value; and
    updating said key programming device with said new preferred algorithms.

7. The method as defined in claim 6 tracking each key programming and upon connection with said master database, providing a log thereof.

8. The method as defined in claim 6 tracking location of each key programming and upon connection with said master database, providing a log thereof.

9. The method as defined in claim 6 collecting vehicle identification information and upon connection with said master database, providing a log thereof.

10. A device for programming vehicle keys, the device comprising:
    a processor for processing instructions;
    a local database including vehicle information and at least one associated vehicle immobilizer algorithm wherein each of said algorithms has a value;
    a vehicle interface for communicatively coupling with a vehicle and a key;
    said processor, in response to said vehicle information, determines a preferred algorithm from said at least one associated vehicle immobilizer algorithm for key programming and adjusts said value in response to said key programming; and
    a network interface for establishing communications with a system server and master database wherein said device provides said adjusted values and receives updated vehicle information.

11. The device as defined in claim 10 wherein said device tracks each key programming and upon connection with said system server provides a log thereof.

12. The device as defined in claim 10 wherein said device is locked from programming keys after a period of time in which it has not connected with said system server.

13. The device as defined in claim 10 wherein said value is adjusted by a positive value upon a successful programming and by a negative value upon an unsuccessful programming.

14. The device as defined in claim 13 wherein said positive value is +1 and said negative value is −1.

15. The device as defined in claim 10 wherein said device tracks a location of each programming.

16. The device as defined in claim 10 wherein said device collects vehicle identification information.

\* \* \* \* \*